(12) United States Patent
Partridge et al.

(10) Patent No.: US 7,803,275 B2
(45) Date of Patent: Sep. 28, 2010

(54) MEMBRANE SEPARATION PROCESS USING MIXED VAPOR-LIQUID FEED

(75) Inventors: Randall D. Partridge, Califon, NJ (US); Walter Weissman, Basking Ridge, NJ (US); Bal K. Kaul, Fairfax, VA (US); Craig Y. Sabottke, Annandale, NJ (US); Sanjay K. Bhatia, Manassas Park, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 578 days.

(21) Appl. No.: 11/827,007

(22) Filed: Jul. 10, 2007

(65) Prior Publication Data

US 2008/0011680 A1    Jan. 17, 2008

Related U.S. Application Data

(60) Provisional application No. 60/830,614, filed on Jul. 14, 2006.

(51) Int. Cl.
*B01D 15/00* (2006.01)
*B01D 53/22* (2006.01)
*C07C 7/144* (2006.01)

(52) U.S. Cl. .............. 210/640; 95/45; 95/50; 210/500.27; 585/818; 585/819

(58) Field of Classification Search ........... 210/640, 210/500.27, 500.39; 95/45–52; 585/818, 585/819
See application file for complete search history.

(56) References Cited

U.S. PATENT DOCUMENTS

| | | | | |
|---|---|---|---|---|
| 5,039,418 | A * | 8/1991 | Schucker | 210/640 |
| 5,288,712 | A * | 2/1994 | Chen | 210/640 |
| 5,670,052 | A | 9/1997 | Ho et al. | |
| 7,303,681 | B2 * | 12/2007 | Sabottke et al. | 210/653 |
| 7,314,565 | B2 * | 1/2008 | Sabottke et al. | 210/640 |
| 7,318,898 | B2 * | 1/2008 | Sabottke | 210/650 |
| 2004/0173529 | A1 | 9/2004 | Da Costa et al. | |

* cited by examiner

*Primary Examiner*—Ana M Fortuna

(57) ABSTRACT

The present invention pertains to a process for the separation of aromatics from a feed stream, including aromatics and non-aromatics by selectively permeating the aromatics through a membrane comprising feeding a mixed phase vapor-liquid feed to a membrane wherein said liquid phase preferentially wets the surface of the membrane.

10 Claims, 3 Drawing Sheets

MEMBRANE SEPARATION PROCESS USING MIXED VAPOR-LIQUID FEED

This Application claims the benefit of U.S. Provisional Application No. 60/830,614 filed Jul. 14, 2006.

BACKGROUND OF THE INVENTION

The present invention relates to the membrane separation of higher boiling point components from mixtures with a wide range of boiling points. In particular, the present invention is a membrane and process to separate aromatics from gasoline, or similar wide-boiling mixtures, such as petroleum naphtha.

Pervaporation is a well-known membrane process. Pervaporation has been and is being considered for recovery of aromatics from refinery streams. A multicomponent liquid feed may be separated based on a selective solution-diffusion mechanism, with the permeate removed as a vapor. A vacuum is typically maintained on the permeate side of the membrane to facilitate permeation. Pervaporation is an endothermic process. Heat input is required to maintain the pervaporation process. Typically, the feed to the pervaporation process is preheated to temperature selected for efficient permeation of the select portion of the feed into the membrane, and at a pressure sufficient to maintain the feed in liquid phase. The desired operating temperature and flux are maintained by heating the membrane and/or by reheating the feed. Adiabatic operation in conventional membrane separation systems can result in a significant drop in temperature and loss of permeate flux. Interstage reheating of the retentate/feed is conventionally used to maintain temperature. Adiabatic operation is very desirable, and most desirable without a significant drop in temperature.

Gasoline is a complex mixture of aliphatic and aromatic hydrocarbons having a wide boiling range. Aromatics may be separated from gasoline by pervaporation to obtain higher-octane fuel. However, the wide boiling range, variable composition and volatility of market gasolines make separation with simple pervaporation membrane systems difficult and inefficient. The lower boiling, lower octane aliphatic components in gasoline permeate competitively with the higher boiling higher-octane aromatics, thereby limiting the permeation of the aromatic content. The competitive permeation of aliphatic compounds also limits membrane selectivity, thereby reducing aromatic selectivity. High yields of aromatic permeate require considerable energy, which reduces the overall efficiency of the membrane system. Prior art membrane systems have also employed pre-distillation steps to remove lower boiling aliphatics from gasoline, thereby concentrating aromatics in the higher boiling liquid. Complex systems using pre-fractionation, multi-stage membrane processing, and/or recycle with post-fractionation, to address these issues are generally not desirable for efficient membrane systems.

The present invention enables considerable simplifications to the pervaporation process, when separating wide boiling range feeds such as gasoline for example. These simplifications can lead to the reduced cost, weight and volume and system complexity required for increased efficiency to enable commercialization of this application.

SUMMARY OF THE INVENTION

Processes for the segregation of aromatics from gasoline cuts by use of a pervaporation membrane system typically involve liquid feed operation. When a liquid feed approach is applied to wide range boiling streams, e.g marketable gasolines, a relatively deep vacuum is required to achieve concentrations of aromatics in the permeate. This is because the C6 and lower boiling point constituents of the gasoline, typically relatively low in aromatics, permeate the membrane preferentially unless the backpressure on the membrane is low enough to mitigate the effect of the high vapor pressure of these compounds on permeation rate.

In the present invention, the competitive permeation of low boiling aliphatics can be largely avoided allowing effective performance with enhanced aromatics selectivity at only moderate membrane backpressures. The present invention includes feeding the gasoline or naphtha in a mixed vapor/liquid phase state, at a controlled extent of vaporization and then operating the membrane module in an essentially adiabatic mode. This eliminates the need for any predistillation. The heavier aromatic rich portion of the vapor preferentially condenses onto the membrane, enhancing aromatics permeation, and the heat of condensation of this portion of the vapor provides the heat needed to vaporize the permeate on the back side of the membrane. As the aromatics permeate the membrane (depleting aromatic content of the liquid contacting the membrane) they are replenished by the continual preferential condensation of the higher boiling aromatics contained in the vapor portion of the feed.

DETAILED DESCRIPTION OF THE PREFERRED EMBODIMENTS

Separations of aromatics from gasoline, or similar wide-boiling mixtures, such as petroleum naphtha, are improved by means of a pervaporation membrane process employing a mixed phase vapor-liquid feed. The extent of feed vaporization is controlled, as detailed hereinafter, a consequence of which aromatic selectivity of the permeate is increased. Higher permeate yields of aromatics are also made possible in adiabatic operations. Simplified system configurations are enabled with the present invention.

Partial vaporization of gasoline feed concentrates the higher boiling fraction of the feed which is rich in aromatic components in the liquid fraction. Preferential wetting of the membrane surface by this liquid phase results in higher aromatic concentrations contacting the membrane, thereby improving flux and selectivity when compared to processing the full boiling range gasoline as a liquid. Lower boiling aliphatic components of the gasoline preferentially remain in the vapor phase, thereby reducing competitive permeation through the membrane.

Furthermore, adiabatic operation of the pervaporation membrane separation process is improved by employing mixed phase vapor-liquid feed. Progressive condensation of the vapor phase, provides heat to the membrane thereby minimizing the temperature change of the membrane resulting from the endothermic pervaporation process. Significant permeate yield gains are made possible from near adiabatic operation using mixed-phase feed. Consequently, the membrane area required can be reduced. Pervaporation of mixed-phase vapor/liquid feed enables considerable simplifications to the process scheme, i.e. predistillation of lower boiling components in the feed can be avoided, along with the associated pumps and controls. Interstage and/or internal heat exchangers to maintain pervaporation temperature can be reduced or eliminated.

Figure 1:
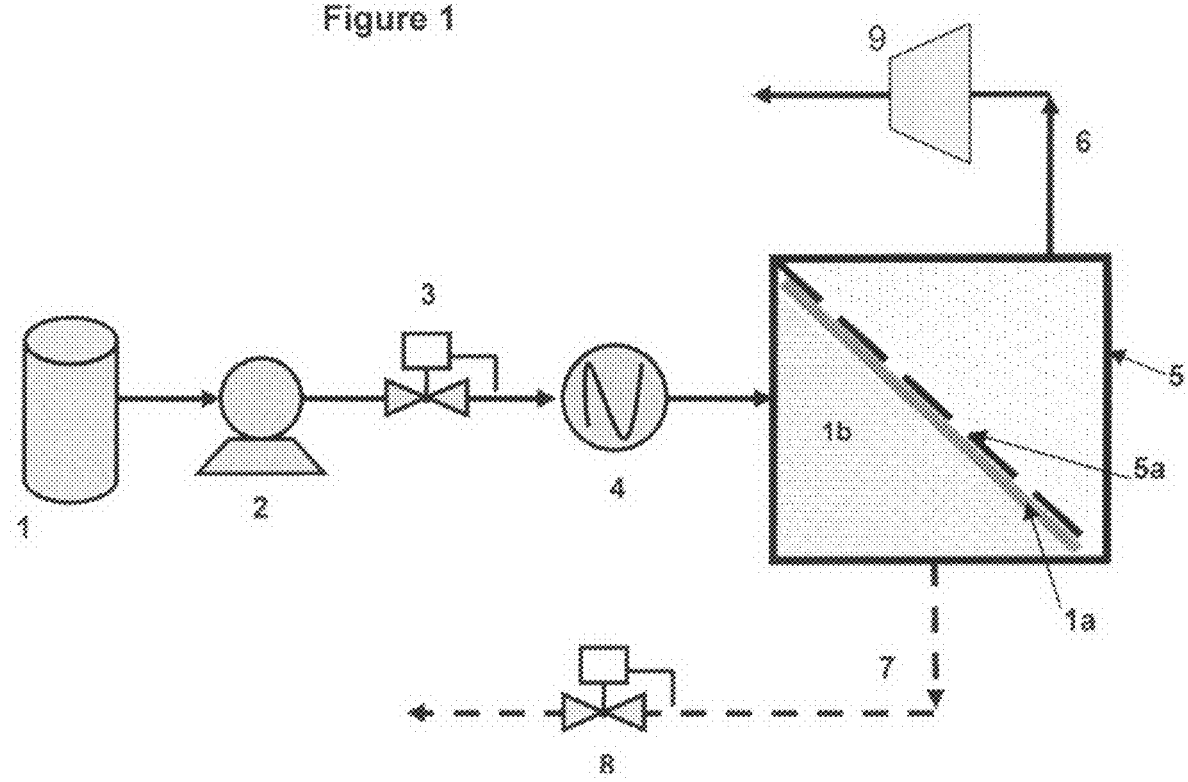
FIG. 1 illustrates a simple embodiment of the present invention.

Referring to FIG. 1, there is shown a very simplified schematic illustration of the membrane separation system of the present invention. A feed reservoir contains the wide boiling range material (1) that is intended for membrane separation, such as conventional gasoline or naphtha, for example. The term "wide boiling range" in the context of gasoline or naphtha means a boiling range of greater than about 50° C. and preferably great than 150° C. from the initial boiling point to the final boiling point as determined by ASTM MethodD86-05. Gasoline boiling ranges from 30° to 200° C. are typical based on this method. Aromatic constituents are found in fractions boiling above about 80° C. Pump means (2) is used to feed and pressurize the feed material to the membrane apparatus (5). The desired feed rate is controlled by a flow control valve (3). The desired feed pressure is controlled by back pressure regulating means (8) operating on the retentate (7) selected based on the composition of the feed and desired operating temperature of the membrane. Heater means (4) is used to control the temperature of the feed to the membrane apparatus (5). In a preferred embodiment, the feed pressure $P_f$ and membrane temperature $T_f$ are controlled to provide an optimal vapor liquid mixture to the membrane. By optimal, we mean a vapor liquid mixture whereby the aromatic components in the feed are concentrated in the liquid portion contacting at least a portion of the membrane. Conversely, the lower boiling point aliphatics are concentrated in the vapor. In a preferred embodiment, the aromatics in the liquid portion of the vapor liquid mixture fed to the membrane are concentrated by greater than about 10%, more preferably greater than about 25%, and most preferably greater than about 50%. The end result of which is to condense a liquid layer onto the membrane that is rich in the constituents of the feed that comprise the preferred permeate while maintaining the remaining feed in a vapor state. The term "preferred permeate" means the constituents of the feed that the invention's user wish to separate, as permeate, from the feed. The term "preferred retentate" means the constituents of the feed that the invention's user wish to separate as retentate and which, if in liquid form at the separation membrane, would compete with the preferred permeate. In this embodiment, the preferred retentate contains aliphatic constituents of the feed that have a lower boiling range than the preferred permeate.

Feed material is partially vaporized to maintain dual feed states, liquid (1a) and vapor (1b). The term "partially vaporized" means there is sufficient vaporization to provide the optimal vapor liquid mixture to the membrane. As illustrated in the figure, the liquid (1a) contacts and wets the pervaporation membrane (5a). As previously described, liquid (1a) has an increased content of the preferred permeate (relative to the feed), while the vapor (1b) phase has an increased content of the preferred retentate.

The pervaporation membrane (5a) is a selective membrane, selected to preferentially permeate the preferred permeate. In a preferred embodiment where feed (1) comprises gasoline or naphtha, for example, and the preferred permeate is aromatics rich hydrocarbons, pervaporation membrane (5a) is an aromatic selective membrane such as described in U.S. Pat. No. 5,670,052 for example. The selective pervaporation membrane (5a) may include a physical porous support means (not shown) such as thermo mechanically expanded polytetrafluoroethylene, commercially available as Gore-Tex™, a registered trademark of W. L. Gore and Associates, for example, capable of providing physical support of the selective pervaporation membrane (5a) under the temperature, pressure, and materials conditions described herein. Alternative supports include sintered metal or ceramic porous media. A preferred support means includes an asymmetric porous media such as a porous ceramic tube or monolith having a microporous surface material, such as described in co-pending application U.S. Ser. No. 60/836,319.

In a preferred embodiment, selective pervaporation membrane (5a) comprises a cross-linked polyimide-polyadipate membrane polymer supported on a porous ceramic support means.

A feature of the present invention is the substantially adiabatic operation of the pervaporation membrane (5a). The pervaporation process is endothermic. As previously described, the feed material is maintained partially vaporized. Progressive condensation of the higher boiling temperature constituents of the vapor phase feed onto the pervaporation membrane supplies heat to the membrane, offsetting the heat lost to the endothermic pervaporation process.

Yet another feature of the present invention is the liquid layer (1a) that contacts the separation membrane (5a). The membrane temperature $T_f$ and the pressure on the membrane feed side $P_f$ are maintained to condense a relatively thin layer of preferred permeate rich condensate on the membrane surface. Though not intending to be bound by any particular theory, in a preferred embodiment the liquid layer (1a) is maintained as a relatively thin layer to facilitate achieving and maintaining both thermal and compositional equilibrium between vapor, liquid and membrane. In the embodiment where feed comprises conventional gasoline or naphtha and the preferred permeate is the aromatic constituents of the feed, the liquid layer is maintained by control of $T_m$ and $P_f$ such that the condensation rate of aromatic-rich constituents is about equal to the permeate rate of such constituents.

Permeate (6), having increased concentration of the preferred permeate, is condensed and collected by conventional means illustrated by pump means (9).

Retentate (7) is collected by conventional means.

The examples presented below illustrate and exemplify the subject matter for this invention.

EXAMPLE 1

Pervaporation Membrane

An aromatic selective membrane of the type described in U.S. Pat. No. 5,670,052 was used to concentrate aromatics from the gasoline in the permeate. The polyimide-polyadipate membrane used was crosslinked with diepoxidecyclooctane (DECO). The polyimide hard segment contains pyromellitic dianhydride (PMDA) and 4,4'-methylene bis(2-chloroaniline) (MOCA). The soft segment polyadipate had a molecular weight of about 2000.

The PEI-DECO polymer was coated on a 0.1 micron porosity Gore-Tex™ support to a thickness of about 40 microns. The polymer film was protected by an additional layer of 0.05 micron porosity Gore-Tex™ overlayer, thereby creating a sandwich structure with a total membrane thickness of about 150 microns. Spiral-wound membrane elements of 0.9 m² active area each were fabricated from the coated sheets and used for the separations as described in Examples 3 and 4.

A plate-frame (wafer cassette) module design with internal heating was also used as noted in the examples. Polymer coating thickness was 7 microns. Two sheets were layered together, front to back, for a nominal total PEI-DECO polymer thickness of 14 microns, followed by an additional 0.05 micron porosity Gortex overlayer. Several sheets were used flat and sealed by means of viton o-rings to obtain 0.2 m² area.

EXAMPLE 2

Figure 2:
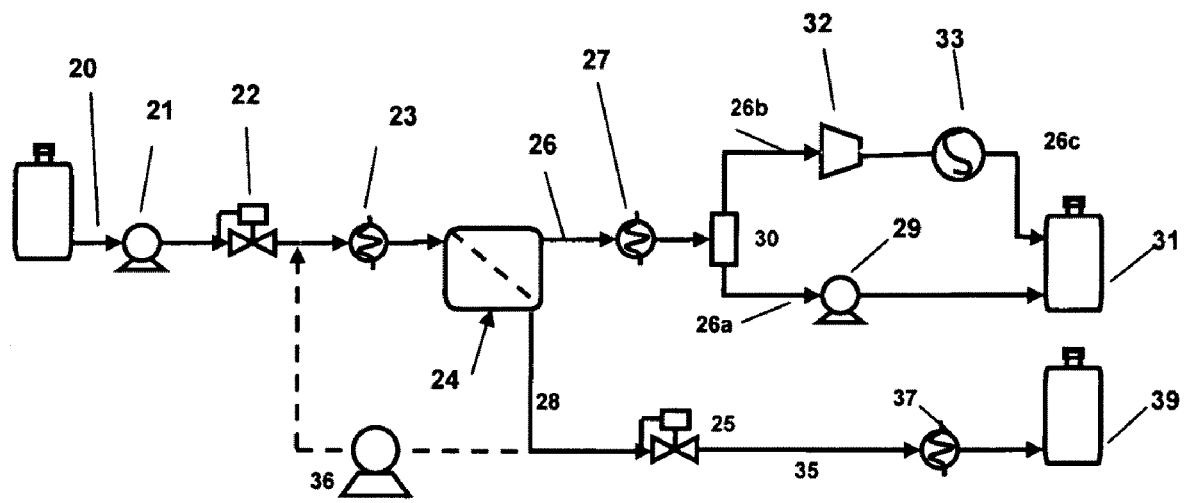
FIG. 2 shows a schematic of the apparatus used for Improved Membrane Separation using mixed vapor-liquid feed.

A simplified process schematic of the apparatus used in this example is provided in FIG. 2. A conventional gasoline feed (20) was pressurized by pump (21) to obtain the desired feed pressure. Feed flow was controlled by a mass flow control valve (22). The feed was heated to the desired temperature by means of a heat exchanger (23) by contacting against a circulating hot ethylene glycol-water mixture, for this example, typically maintained at 120° C. Alternatively, a silicone oil bath was used to obtain gasoline feed temperatures up to about 160° C. The preheated feed is substantially vapor upon delivery into the membrane module (24). Backpressure on the membrane was controlled by means of a pressure regulator (25) operating on the retentate stream (28) thereby providing the desired operating pressure $P_f$. The permeate (26) was recovered under vacuum provided by a vacuum pump (32). The permeate vapor was cooled by means of heat exchanger (27) to about 30° C. The "heavy" permeate condensate (26a) was separated, by means of the gas/liquid vacuum separator (30), from the remaining permeate vapor (26b), and recovered by means of a liquid pump (29) then stored in gasoline reservoir (31) which, in this example, is a high octane fuel reservoir. The remaining permeate vapor (26b) was compressed by the vacuum pump (32) and cooled to about 30° C. by heat exchanger (33) to obtain additional "light" liquid permeate (26c) from the vacuum exhaust. Alternatively, the entire permeate (26) was cooled by heat exchanger (27) and compressed by vacuum pump (32) to obtain the high octane fuel. Hot retentate (28) was cooled to about the ambient temperature of 20° C. by means of forced air-fin heat exchanger (37) and stored in reservoir (39) which serves in this example as a low octane gasoline reservoir. In some examples, a portion of the hot retentate (28) was recycled by means of pump (36) to mix with the membrane feed (20) prior to heating with heat exchanger (23).

EXAMPLE 3

For this embodiment, a polymer coated ceramic monolith was constructed in the following manner:

A solution of poly(ethylene adipate) "PEA," pyromellitic dianhydride "PMOA," 4,4'-methylene bis(2 chloroaniline) and 1,2,5,6-diepoxycyclo octane "DECO" was mixed with equal amounts of DMF and acetone to create an approximate 2.0 wt % polymer solution. The final molar ratios of the components were nominally 1-PEA2000/2-PMDA/1-MOCA/2-DECO. The solution was maintained at room temperature or lower after adding DECO. The solution was used to coat a porous ceramic monolith by drawing the liquid polymer into the porous surface of the monolith. The coated monolith was caused to form a polymer film of the composition described in U.S. Pat. No. 5,670,052 on the surfaces, including the interior surfaces, of the porous monolith, forming a polymer coating substantially free of voids and holes, having a surface area of about 0.1 m².

The membrane was used in the simplified process and apparatus depicted in FIG. 2. A conventional gasoline comprising Japanese regular unleaded winter grade gasoline was used as feed (21). The feed gasoline was tested to determine its octane rating and composition, having about 90.3 RON, about 33.9 wt % aromatics, and about 23.1 wt % C5 minus light aliphatic hydrocarbons. The process illustrated in FIG. 2 was operated under two sets of conditions, the first to produce a liquid phase feed to the membrane system, the second to produce a mixed liquid/vapor feed in accordance with the present invention. Liquid phase feed conditions were obtained by operating at a membrane feed pressure $P_f$ of about 960 kPa (absolute), and a membrane outlet pressure of about 950 kPa (absolute). Membrane feed temperature was maintained at about 140° C. These pressures are substantially above the bubble point pressure of the gasoline feed at 140° C., whereby the membrane feed is maintained in a liquid state.

The same apparatus was used under a second set of process conditions to produce a mixed liquid/vapor phase feed. Accordingly, the membrane inlet pressure was maintained at about 465 kPa (absolute) measured after control valve (22), and membrane outlet at about 445 kPa (absolute) measured at the back pressure regulator (25). Membrane feed temperature was maintained at about 140° C., measured at the inlet distributor to the membrane element after heat exchanger (23). Under these conditions, feed to the membrane was estimated to be about 45 wt % liquid and 55 wt % vapor. Outlet temperatures were measured in the retentate stream exiting the membrane element. In both the liquid phase case and the mixed liquid/vapor case, vacuum was maintained on the cooled permeate by means of an eductor pump (32). Table 1 below compares permeate rate, permeate octane number, permeate density, permeate aromatics, and permeate aliphatics for both liquid and mixed liquid/vapor feed. Operating with liquid phase conditions resulted in a permeate rate of 0.11 g/s. The adiabatic temperature drop resulting from the pervaporation process was 21° C. The permeate pressure obtained by condensing and pumping away the permeate was 40.7 kPa. The permeate obtained with liquid phase feed had increased aromatic content, but a substantial increase in C5Minus light hydrocarbon content. The light hydrocarbons resulted in a higher vapor pressure permeate and consequently higher permeate pressure. It should be noted that an effect of use of the eductor (32) is that the permeate pressure is affected by the permeate stream control and is not independently set by the user. The octane number increased corresponding to the increased aromatic content.

Mixed phase vapor/liquid feed to the membrane in accordance with the present invention, produced improved membrane separation performance. Permeate rate increased to 0.17 g/s. The adiabatic temperature drop was less at 11° C., a consequence of vapor condensation in the membrane feed channels balancing the heat loss associated with the endothermic pervaporation process. Vacuum improved with the permeate pressure at 23 kPa and a corresponding decrease in the volatile C5Minus hydrocarbons in the permeate. The aromatic content of the permeate increased substantially to 52.5%. The permeate octane rating increased to 97.8 RON corresponding to the increased aromatics content and reduced C5Minus content.

TABLE 1

| Phase | Feed | Liquid | Mixed |
|---|---|---|---|
| Feed Rate, g/s | | 1.0 | 1.0 |
| Temperature at Inlet, ° C. | | 139.2 | 139.1 |
| Pressure at Inlet, kPa | | 960 | 465 |
| Temperature at Outlet, ° C. | | 117.8 | 128.3 |
| Pressure at Outlet, kPa | | 950 | 445 |
| Permeate Rate, g/s | | 0.11 | 0.17 |
| Permeate Pressure, kPa | | 40.7 | 23.3 |

TABLE 1-continued

| Phase | Feed | Liquid | Mixed |
|---|---|---|---|
| Permeate Octane Number, RON | 90.3 | 96.1 | 97.8 |
| Permeate Density g/cc at 20° C. | 0.7253 | 0.7285 | 0.7668 |
| Permeate Aromatic, wt/% | 33.9 | 37.5 | 52.5 |
| Permeate C5Minus HC, wt % | 23.1 | 31.9 | 17.2 |

EXAMPLE 4

Figure 3:
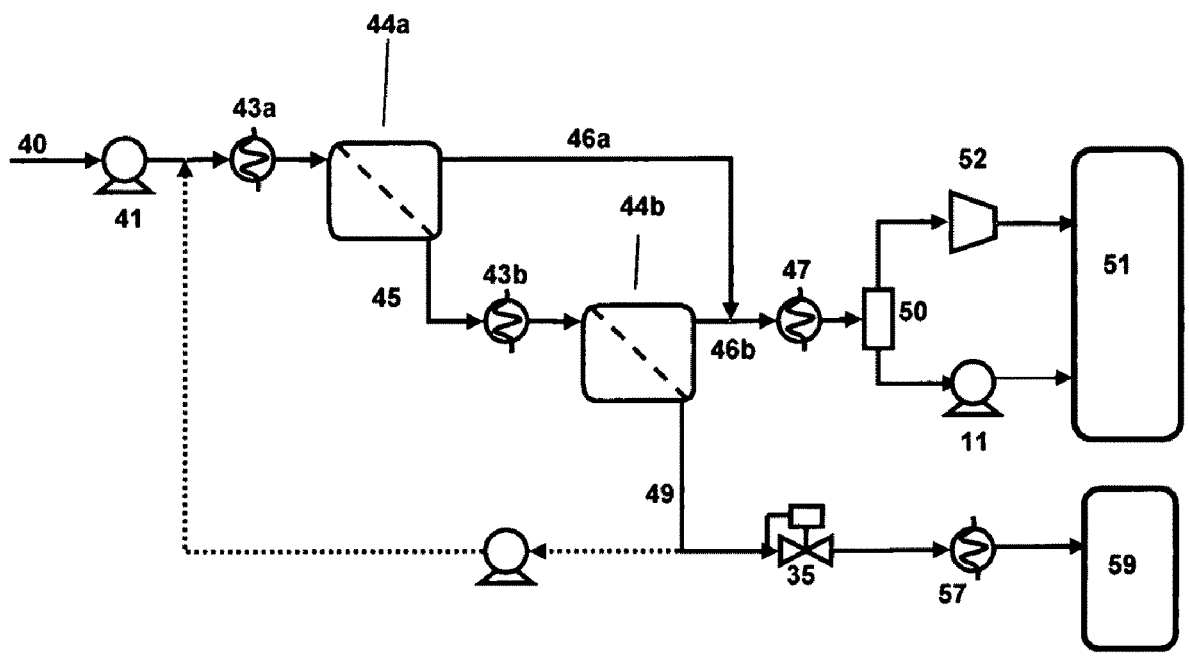
FIG. 3 shows a schematic of alternative apparatus for improved membrane separation using mixed vapor-liquid feed.

The embodiment of the present invention illustrated in FIG. 2 may be extended to a two stage membrane system, as illustrated in FIG. 3.

Similar to example 2, a conventional gasoline 40 was pressurized by pump (41) to obtain the desired feed pressure. Feed flow was controlled by a mass control valve, not shown. The feed was heated to the desired temperature by heat exchanger (43*a*). The pre-heated feed is substantially vapor upon delivery to first membrane module (44*a*). The feed pressure $P_f$ and temperature $T_f$ were maintained to provide an estimated optimal vapor-liquid mixture to the membrane whereby a relatively thin layer of liquid is maintained in contact with the membrane to contact the membrane with aromatics rich liquid. The temperature $T_f$ and pressure $P_f$ are controlled such that the condensation rate of aromatic rich feed constituents is about equal to the permeation rate of such constituents.

The retentate (45) from the first membrane module (44*a*) is re-heated by heat exchanger (43*b*) and fed to second membrane module (44*b*), operated in substantially the same manner as described for first membrane module (44*a*). Aromatics-rich permeate (46*a*) and 46*b*) from the first and second membrane modules are collected and cooled by heat exchange (47), separated by separator means (50) and stored in the high RON reservoir (51). Retentate (49) from the second membrane module (46*b*) is either cooled by heat exchanger (57) and stored in low RON reservoir (59), or recycled to supplement fresh feed (40).

What is claimed is:

1. A process for the separation of aromatics from a feedstream, including aromatics and non-aromatics and having a boiling range of at least 50° C., by selectively permeating the aromatics through a membrane comprising feeding a mixed phase vapor-liquid feed to a membrane wherein feed pressure $P_f$ and feed temperature $T_f$ are selectively controlled to condense a liquid layer upon the feed side of the membrane having an aromatics concentrate at least 25% greater than the feed stream.

2. The process of claim 1 wherein the aromatics concentrate is at least 50% greater than the feedstream.

3. The process of claim 1 wherein said process is carried out adiabatically.

4. The process of claim 1 wherein heat is provided by the condensation of the vapor phase.

5. The process of claim 1 wherein said feedstream is gasoline or petroleum naphtha.

6. The process of claim 1 wherein the membrane is a polyester imide copolymer membrane, polyurethane imide membrane, polyimide aliphatic polyester copolymer membrane, diepoxyoctane cross linked/esterified polyimide/polyadiapate copolymer membrane, or a combination thereof.

7. The process of claim 6 wherein the polymer or copolymer membrane is supported by a porous substrate.

8. The process of claim 7 wherein the substrate comprises Gortex® (thermo mechanically expanded polytetrafluoroethylene).

9. The process of claim 7 wherein the substrate is a porous ceramic.

10. The process of claim 7 wherein said substrate comprises a porous ceramic and said membrane is a crosslinked polyimide-polyadipate polymer, coating at least a portion of the ceramic.

* * * * *